United States Patent [19]

Wion

[11] 4,294,036
[45] Oct. 13, 1981

[54] FIGURE FOR ARRANGEMENT ON MAGNETICALLY ATTRACTIVE SURFACE

[75] Inventor: David W. Wion, Glen Waverley, Australia

[73] Assignee: Magmate Australia Proprietary Limited, Glen Waverleg, Australia

[21] Appl. No.: 68,001

[22] Filed: Aug. 20, 1979

[30] Foreign Application Priority Data

Aug. 24, 1978 [AU] Australia ............... PD5647

[51] Int. Cl.$^3$ ............................................ A63H 33/26
[52] U.S. Cl. ...................................... 46/242; 40/600; 434/256
[58] Field of Search .................. 46/241, 242, 22, 156, 46/157, 161; 35/7 A, 26, 28, 29; 352/52, 54, 87; 40/421, 600; 434/256, 267, 269

[56] References Cited

U.S. PATENT DOCUMENTS

| | | | |
|---|---|---|---|
| 1,531,070 | 3/1925 | Bruns | 46/241 UX |
| 2,091,144 | 8/1937 | Friel | 352/52 |
| 2,180,181 | 11/1939 | Versoy | 35/28 X |
| 2,402,949 | 7/1946 | Carmichael | 46/241 |
| 3,068,744 | 12/1962 | O'Hara-Wright | 352/87 |
| 3,090,157 | 5/1963 | Lohr | 46/157 |
| 3,726,026 | 4/1973 | Bercherding | 40/600 X |

FOREIGN PATENT DOCUMENTS

| | | | |
|---|---|---|---|
| 569665 | 2/1933 | Fed. Rep. of Germany | 352/54 |
| 1279945 | 11/1961 | France . | |
| 846963 | 9/1960 | United Kingdom . | |

OTHER PUBLICATIONS

Gardner, A. R.-Article in *Product Engineering* of Jan. 9, 1961, pp. 65-68.

*Primary Examiner*—F. Barry Shay
*Attorney, Agent, or Firm*—Lane, Aitken, Kice & Kananen

[57] ABSTRACT

The present specification discloses an articulated figure comprising a plurality of body and limb components pivotally attached to each other and formed from flexible magnetic rubber of such a thickness that the maximum possible surface to surface contact can be achieved between the components and a metallic surface to which the figure is to be adhered. The components are connected by rivets passing with clearance through holes therein.

7 Claims, 3 Drawing Figures

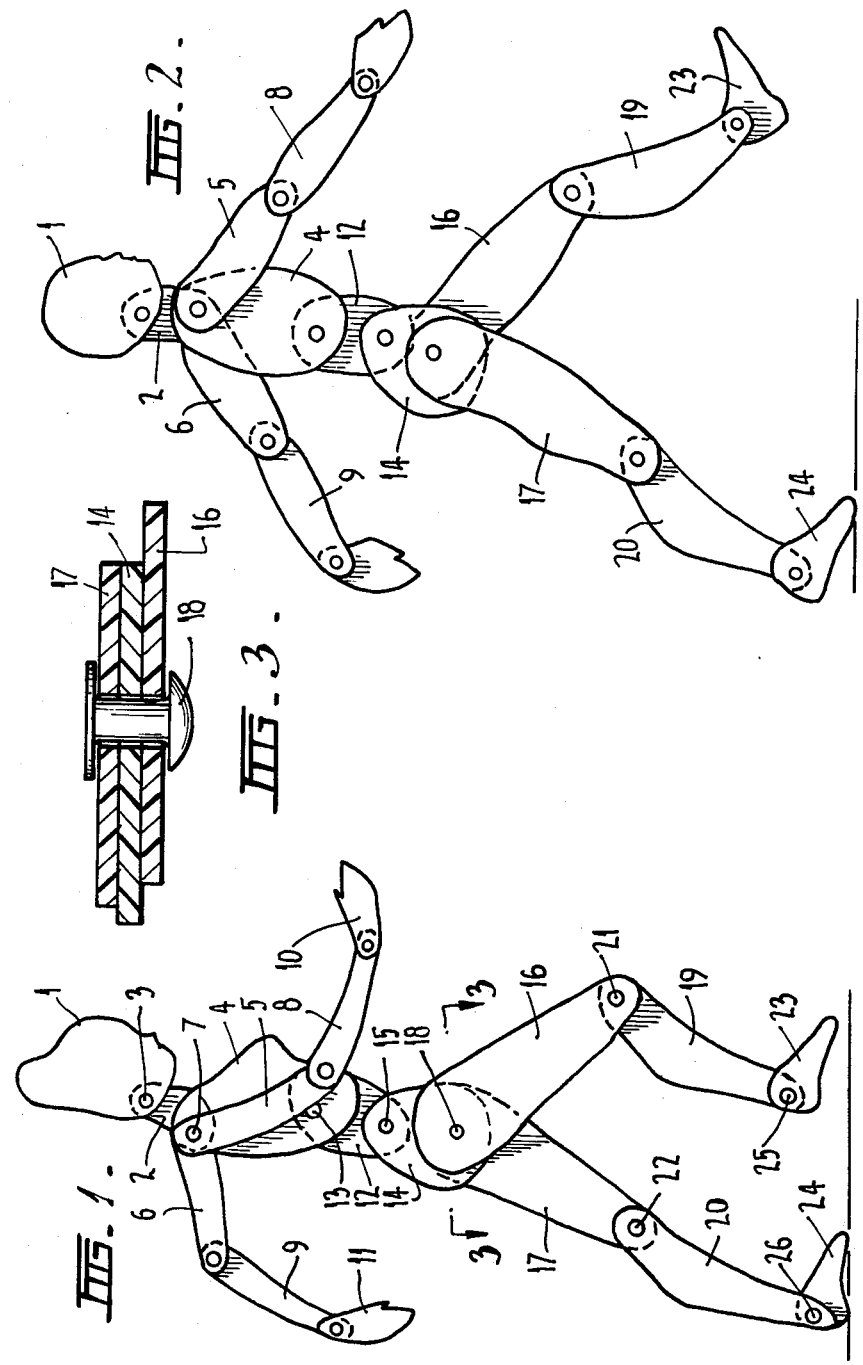

1

FIGURE FOR ARRANGEMENT ON MAGNETICALLY ATTRACTIVE SURFACE

BACKGROUND OF THE INVENTION

This invention relates to an improved articulated figure of the type suitable for use as an instructional aid, toy or display device.

In the prior art, various types of articulated figures having jointed limbs are known, for example see U.S. Pat. Nos. 1,677,652 Peck, 3,090,157 Lohr and 3,727,343 Chiari and Australian Specification No. 56076/65. Similarly, it is known to use magnetic means to support a rigid display articles on metallic boards or panels, see for example U.S. Pat. Nos. 3,654,711 Taylor, 3,769,720 Terrones and 3,883,984 Champeaux.

In each of the first mentioned U.S. Patents referred to above, the figure is either adapted to stand upright on supporting feet or is supported by a suspension string. For this reason, the limbs are rigid and the joints tight (thereby requiring fairly close manufacturing tolerances) to enable the limbs to be articulated to and remain in different display positions. In Australian Specification 56076/65, an articulated figure is used in conjunction with a complex electronically operated electromagnetic board whereby animated cartoon movements are reproduced in the figure.

In each of U.S. Pat. Nos. 3,654,711 and 3,769,720, the display figures are not articulated in any way so that the interest created by the figures is not particularly great. In U.S. Pat. No. 3,883,984, the various components of the dummy are held to each other by magnetic attraction between the various parts so that the limbs of the dummy are movable relative to each other only within close limits dictated by the magnetic attraction between the various parts. The limbs are however not articulated and only a limited number of limb positions are possible.

It is the object of the present invention to provide an improved articulated figure which enables the figure to be held in any one of a wide variety of desired positions in a particularly convenient, inexpensive and appealing manner.

SUMMARY OF THE INVENTION

The present invention therefore provides an articulated figure comprising a body portion and a plurality of limbs pivotally attached to the body portion, characterised in that at least said limbs are formed from flexible magnetic material, the flexibility of said magnetic material being such that substantial surface to surface contact can be achieved between at least said limbs and a flat magnetically attractive metallic surface by virtue of the magnetic attraction between said limbs and said metallic surface, said limbs therefore being held in any articulated position by said magnetic attraction.

In use the articulated figure adheres securely to any relatively flat metallic surface and the figure may be arranged or rearranged in any desired pose whether for instructional purposes, display purposes or simply as a decorative toy. Because at least the limbs are both flexible and magnetic, good surface to surface contact between the limbs and the metallic surface is ensured and the figure is adequately supported notwithstanding the fact that the limbs are also articulated.

BRIEF DESCRIPTION OF THE DRAWINGS

The above and other objects and advantages of the invention will become more readily apparent from the following description of embodiments of the invention with reference to the accompanying drawings in which:

FIG. 1 is a front elevation of one articulated figure embodying the invention;

FIG. 2 is a front elevation of another articulated figure embodying the invention, and FIG. 3 is a sectional end elevation of one articulated joint of the figure shown in FIG. 1 and taken along the line 3—3 in FIG. 1.

In each of the embodiments of FIGS. 1 and 2, the articulated figure has the same basic construction, the only difference being that the figure shown in FIG. 1 represents a woman while the figure shown in FIG. 2 represents a man. In the ensuing description, the same reference numerals will be used to designate like parts.

The articulated figures shown in FIGS. 1 and 2 comprise a multiplicity of body components which are cut by any suitable means, such as a punch, from a thin magnetic rubber sheeting. The sheeting is most suitably from 0.5 mm to 0.8 mm thick, the thickness being dictated by the need for the body components to be flexible to ensure proper adherence by magnetic attraction and by the cost of the sheeting.

Each articulated body comprises a head component 1, a neck component 2 pivotally connected to the head component 1 by means of a rivet 3 passing through holes in the head component 1 and in the neck component 2 with sufficient clearance to allow the two parts to freely pivot relative to each other. The rivet 3 is of the type shown in FIG. 3 of the drawings having a head and an expanded end portion holding the parts together.

A chest component 4 and two upper arm components 5 and 6 are pivoted to the lower end of the neck component 2 by means of a rivet 7 with the neck component 2 being arranged between the upper arm component 6 and the chest component 4. The upper arm components 5 and 6 have lower arm components 8 and 9 pivoted thereto by rivets and hand components 10 and 11 are similarly pivoted to the ends of the lower arm components 8 and 9.

The chest component 4 has a trunk component 12 pivoted to its lower end by a rivet 13 and the trunk component 12 in turn has a hip component 14 pivotally attached to its lower end by a rivet 15. Thigh components 16 and 17 are pivotally attached to the lower end of the hip component 14 by a rivet 18, as shown in FIG. 3, and each thigh component 16 and 17 has a calf component 19 and 20 respectively pivotally attached thereto by rivets 21 and 22. The calf components 19 and 20 have foot components 23 and 24 attached to their lower ends by rivets 25 and 26.

The articulated bodies shown in FIGS. 1 and 2 may be securely attached to any relatively flat metallic surface, such as a chalk board or a refrigerator door, by the magnetic attraction between the magnetic rubber body components and the metallic surface. Each articulated body component may be arranged in any desired position by sliding the respective component over the metallic surface. In this way the figures may be used for instructional purposes, for example in physical education, for promotional purposes in department stores and the like or simply as a toy for adults and children. Because each body component is flexible, the maximum amount of surface to surface contact between the body components and the metallic surface is achieved to ensure positive attachment of the articulated body to the metallic surface.

By articulating the body components in the specific manner shown in the preferred embodiments, body position and body movement may be accurately simulated for instructional purposes to show movement in a sequential or comparative manner. One of the important features of the preferred embodiments is the provision of a "spinal section", including the chest, trunk and hip components, as this enables the actions of a multitude of joints to be simulated by means of the limited number of components and joints as described above.

Although the embodiments described above are preferred, not only as an instructional aid but also as a display device or toy, because of the wide range of body positions that may be achieved, it will be appreciated that a simplified version of the articulated body may be produced having less body components and less joints. For example, the chest, trunk and hip components may be made as a single component, the hánd components may form part of the lower arm components, and the head and neck components may be made as one. The figure may also represent animals such as dogs, cats, horses, birds, insects and reptiles or any other object having an articulated form.

The overall cost of the articulated figure may be reduced by making some of the body components from flexible plastics sheeting. For example in the embodiments shown in the drawings, only the head, upper arms or hands, thigh and foot components need be made from magnetic rubber. However, while this does reduce the overall cost, it is certainly more convenient to make all components from the same material.

If desired the rivets may be replaced by disassemblable pivots, such as a press stud or a nut and bolt assembly, thus enabling the body components to be removed and replaced whether for instructional purposes or in play. However, for most applications, the rivet arrangement shown in the preferred embodiment is certainly most practical.

In addition to the above uses, the articulated figure may be used as a template to record various body positions and it may also be suitable for use in animation and photography.

I claim:

1. An articulated figure comprising a body component and a plurality of limb components pivotally attached to the body component, characterised in that at least said limb components are formed from flexible magnetic material, the flexibility of said magnetic material being such that the maximum possible surface to surface contact can be achieved between at least said limb components and a flat magnetically attractive surface by virtue of the magnetic attraction between said limb components and said magnetically attractive surface, said limb components therefore being held in any articulated position by said magnetic attraction, said limb components being attached to freely pivot relative to said body component by means of rivets passing with clearance through holes in said body component and said limb components.

2. The figure of claim 1 characterised in that said body component also is formed from flexible magnetic material.

3. The figure of claim 1, characterised in that said limb components are further articulated by pivotal connections between upper and lower limb components and at least the outermost limb components are formed from flexible magnetic material.

4. The figure of claim 3, characterised in that said body component includes a chest component pivotally attached to a trunk component which is in turn pivotally attached to a hip component, said chest, trunk and hip components defining a spinal section which facilitates simulation of actions of a multitude of body joints.

5. The figure of claim 4, characterised in that said body compcnent also includes a head component pivotally attached to a neck component which is in turn pivotally attached to a top portion of said chest component.

6. The figure of claim 2, characterised in that said magnetic material is magnetic rubber sheeting from about 0.5 mm to about 0.8 mm thick.

7. The figure of claim 4, characterised in that said magnetic material is magnetic rubber sheeting from about 0.5 mm to about 0.8 mm thick.

* * * * *